United States Patent

Oishi

(10) Patent No.: US 6,712,971 B2
(45) Date of Patent: Mar. 30, 2004

(54) OPTICALLY ACTIVE POLY (N-METHYLBENZYLMALEIMIDE), METHOD FOR ITS PRODUCTION AND ITS USE

(75) Inventor: Tsutomu Oishi, Yamaguchi (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 10/292,429

(22) Filed: Nov. 13, 2002

(65) Prior Publication Data

US 2003/0149221 A1 Aug. 7, 2003

Related U.S. Application Data

(62) Division of application No. 09/845,341, filed on May 1, 2001, now Pat. No. 6,509,478.

(30) Foreign Application Priority Data

Sep. 25, 2000 (JP) .......................................... 2000-295454

(51) Int. Cl.[7] ...................... B01D 15/08; C07D 207/444

(52) U.S. Cl. ........................ 210/635; 210/656; 210/659; 252/184; 428/425.5; 428/451; 428/473.5; 428/474.4; 548/549

(58) Field of Search ........................ 548/549; 210/635; 252/184; 428/473.5, 474.4

(56) References Cited

U.S. PATENT DOCUMENTS

| 4,322,310 A | 3/1982 | House |
| 4,604,207 A | 8/1986 | Oi et al. |

OTHER PUBLICATIONS

Database WPI, Section Ch, Week 199122, Derwent Publications Ltd., London, GB; AN 1991–159372, XP002184209 & JP 03 093811 A (Nippon Oils & Eats Co Ltd), Apr. 18, 1991; abstract.

Database WPI Section Ch, Week 199344, Dertwen Publications Ltd., London, GB; AN 19930–347480, XP002184210 & JP 05 246950 A (Sumitomo Chem Co Ltd), Sep. 24, 1993; abstract.

Database Compendex Online! Engineering Information, Inc., New York, NY, US; Zhou Hua et al: "Asymmetric anionic polymerization of chiral (R)–(+)–N–alpha–methyl-benzylmaleimide with chiral ligant/organometal complex"; XP002184207, abstract, Polym J.; Polymer Journal 2000 Society of Polymer Science, JPN, Tokyo, Japan, vol. 32, No. 7, 2000, pp. 552–559.

Patent Abstracts of Japan, vol. 2000, No. 21, Aug. 3, 2001 & JP 2001 106729 A (Tosoh Corp), Apr. 17, 2001, abstract.

Database Compendex Online! Engineering Information, Inc., New York, NY, US; Oishi Tsutomu et al: "Synthesis and Polymerization of Potically Active N–Aplpha–Methyl-benzylmalemide"; XP002184208, abstract, J Polym Sci Polym Chem Ed Nov. 1984, vol. 22, No. 11 part 1, Nov. 1984, pp. 1789–2800.

Oishi T et al: "Asymmetric Anionic Polymerization of Maleimides Bearing Bulky Substituents;" Journal of Polymer Science, Polymer Chemistry Edition, John Wiley and Sons; New York, US, vol. 38, No. 2, Jan. 15, 2000, pp. 310–320, XP000878169, ISSN: 0887–624X.

Zhou, et al 2000, Polym J., 32(7), 552–559.

Oishi, et al 1984, J. Polym. Sci., Polym. Chem. Ed., 22(11, pt. 1), 2789–800.

Primary Examiner—Joseph K. McKane
Assistant Examiner—Andrea D. Small
(74) Attorney, Agent, or Firm—Sughrue Mion, PLLC

(57) ABSTRACT

An optically active poly(N-α-methylbenzylmaleimide) represented by the following formula (1):

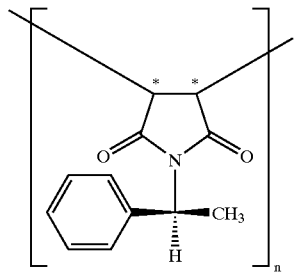

Formula (1)

wherein n is a number within a range of from 2 to 10,000, and symbol * represents optically active carbon, and having a specific rotation ($[\alpha]_{435}^{25}$) of at least +30°.

2 Claims, 5 Drawing Sheets

OPTICALLY ACTIVE POLY (N-METHYLBENZYLMALEIMIDE), METHOD FOR ITS PRODUCTION AND ITS USE

This is a divisional of application Ser. No. 09/845,341 filed May 1, 2001 now U.S. Pat. No. 6,509,478; the disclosure of which is incorporated herein by reference.

BACKGROUND OF THE INVENTION

1. Field of the Invention

The present invention relates to a novel optically active polymaleimide derivative and a method for its production. The optically active polymaleimide derivative is expected to be useful for e.g. a separating medium.

2. Discussion of Background

It is known that an optically active polymaleimide polymer having a certain degree of specific rotation, can be produced by radical polymerization or anionic polymerization using optically active (R)-(+)-N-α-methylbenzylmaleimide as the starting material (T. Oishi et al., J. Polym. Chem. Ed., 22, 2789–2800 (1984)).

On the other hand, a method for obtaining an optically active polymaleimide derivative by asymmetric anionic polymerization of an achiral maleimide derivative, is also known (T. Oishi et al., Chemistry Letters, 1998, 791–792).

However, by the radical polymerization method using optically active (R)-(+)-N-α-methylbenzylmaleimide as the starting material and employing azoisobutyronitrile, the product obtained is of such a low level that the specific rotation ($[\alpha]_{435}^{25}$) is not more than +30°, and the number average molecular weight (Mn) as calculated as standard polystyrene is up to about 3,000.

Further, also by the anionic polymerization using the same starting material and employing butyl lithium, the product obtained is of such a level that the specific rotation is from 0 to −100°, and the molecular weight (Mn) is not more than $3\times10^3$. Thus, optically active polymaleimide derivatives obtained by these conventional methods were not satisfactory with respect to both optical purities and molecular weights, when application to e.g. a separating medium, was taken into account.

On the other hand, by the method for obtaining an optically active polymaleimide derivative by asymmetric anionic polymerization using an achiral maleimide derivative, it is possible to obtain an optically active polymer having a certain degree of specific rotation, but the molecular weight is as low as about $1\times10^3$. Further, no case is known wherein the same method is applied by using an optically active maleimide derivative as a starting material.

SUMMARY OF THE INVENTION

The present inventors have conducted an extensive study to develop an optically active poly(N-α-methylbenzylmaleimide) having a higher optical purity and molecular weight, and as a result, have found it possible to obtain an optically active poly(N-α-methylbenzylmaleimide) having a high specific rotation and a high molecular weight by using optically active (S)-(−)-N-α-methylbenzylmaleimide as the starting material and carrying out anionic polymerization in the presence of an asymmetric ligand. The present invention has been accomplished on the basis of this discovery.

Namely, the present invention provides an optically active poly(N-α-methylbenzylmaleimide) represented by the following formula (1):

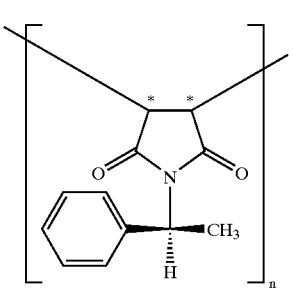

Formula (1)

wherein n is a number within a range of from 2 to 10,000, and symbol * represents optically active carbon, and having a specific rotation ($[\alpha]_{435}^{25}$) of at least +30°.

Further, the present invention provides a method for producing the above-mentioned optically active poly(N-α-methylbenzylmaleimide), which comprises subjecting (S)-(−)-N-α-methylbenzylmaleimide of the following formula (2):

Formula (2)

to anionic polymerization in the presence of an asymmetric ligand.

DETAILED DESCRIPTION OF THE PREFERRED EMBODIMENTS

Figure 1:
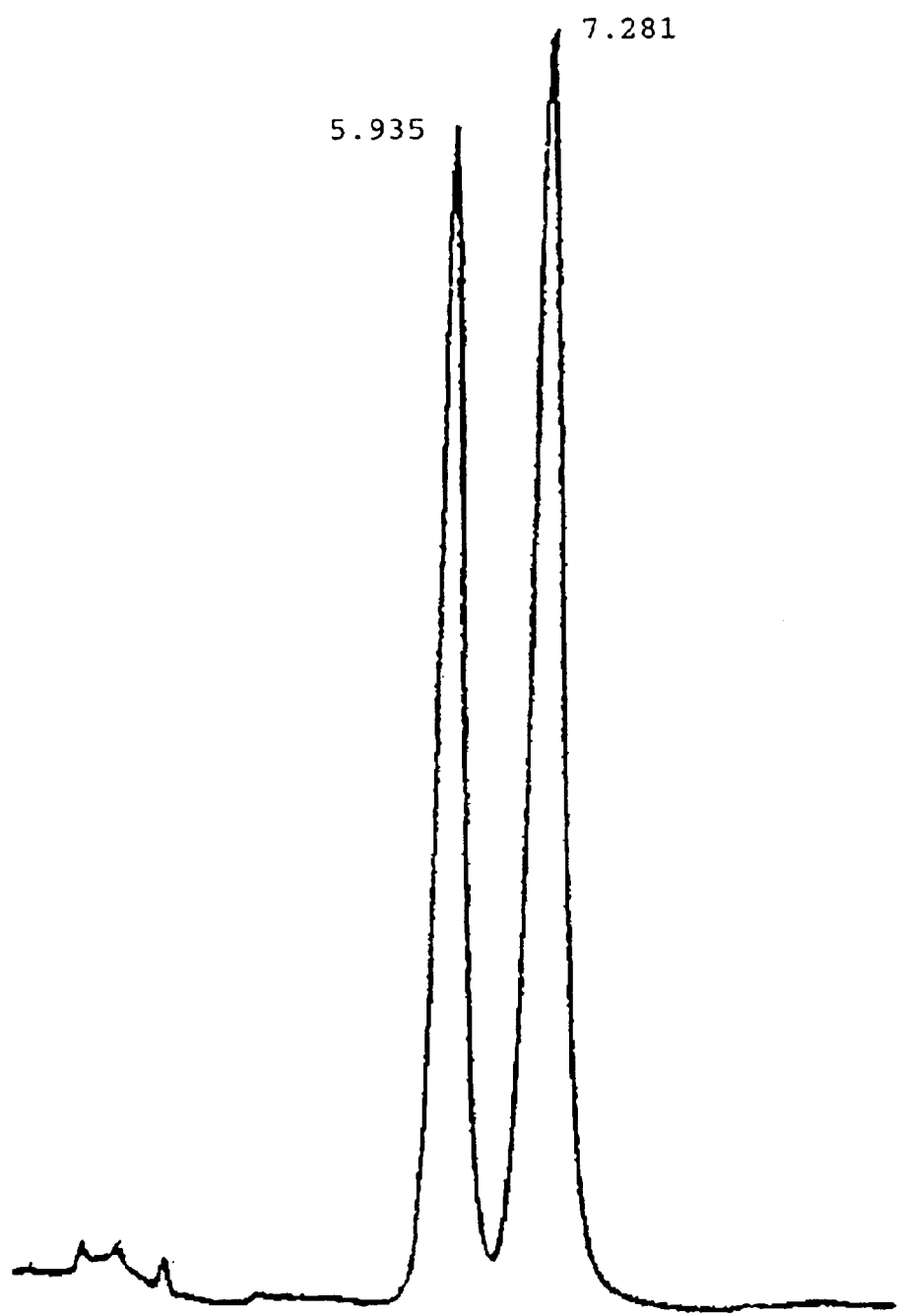
FIG. 1 is a measurement chart showing the results of Example 8.

Now, the present invention will be described in detail.

The optically active poly(N-α-methylbenzylmaleimide) of the present invention is a compound which is represented by the above formula (1) and which has a specific rotation ($[\alpha]_{435}^{25}$) of at least +30°, and its number average molecular weight (Mn) is usually at least $3\times10^3$ as calculated as standard polystyrene.

The optically active poly(N-α-methylbenzylmaleimide) of the present invention can be obtained by subjecting (S)-(−)-N-α-methylbenzylmaleimide of the above formula (2) to anionic polymerization in the presence of an asymmetric ligand.

In the method of the present invention, the (S)-(−)-N-α-methylbenzylmaleimide to be used as the starting material, can be easily prepared by reacting optically active (S)-(−)-methylbenzylamine[(S)-(−)-1-phenylethylamine] with maleic anhydride by a known method. The specific rotation ($[\alpha]_{435}^{25}$) of the obtainable (S)-(−)-N-α-methylbenzylmaleimide can be brought to a level of −98.1° by repeating purification by distillation.

In the method of the present invention, the asymmetric ligand and an anionic polymerization catalyst are added to a solvent for the reaction, and then the starting material (S)-(−)-N-α-methylbenzylmaleimide is added thereto and reacted.

In the method of the present invention, the anionic polymerization catalyst may, for example, be an organic metal catalyst such as n-butyl lithium, fluorenyl lithium, diethylzinc or dimethylzinc, as a suitable one. It is used usually within a range of from 0.1 to 30 mol %, based on the starting material (S)-(−)-N-α-methylbenzylmaleimide to be subjected to the reaction.

In the method of the present invention, the optically active ligand to be used for the anionic polymerization, may, for example, be (−)-sparteine (hereinafter referred to as Sp) of the following formula (3):

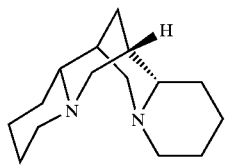

Formula (3)

or (4S)-2,2'-(1-ethylpropylidene)bis[4-(1-phenylethyl)-4,5-dihydroxazole] (hereinafter referred to simply as Bnbox) of the following formula (4):

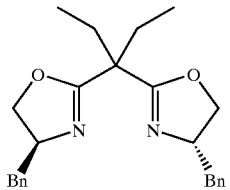

Formula (4)

as a suitable one. The optically active ligand is used theoretically in an equimolar amount to the anionic polymerization catalyst to be used for the reaction, but it is used preferably in an amount of from 1.02 to 1.5 mols, to carry out the reaction under a stabilized condition.

The solvent for the reaction useful for the method of the present invention, is not particularly limited, and any solvent can be used so long as it is inert to the reaction. Specifically, an ether-type solvent such as diethyl ether, di-n-propyl ether, di-i-propyl ether, di-n-butyl ether, di-t-butyl ether or tetrahydrofuran (hereinafter referred to simply as THF), or an aromatic hydrocarbon type solvent such as benzene, toluene, xylene, ethylbenzene or mesitylene, may, for example, be mentioned as a suitable one.

In the method of the present invention, the amount of the solvent is not particularly limited, and it is used usually in an amount of from 2 to 100 times by weight, relative to the (S)-(−)-N-α-methylbenzylmaleimide to be subjected to the reaction. In the method of the present invention, the reaction temperature varies depending upon the reaction condition and is not particularly limited, but the reaction is usually carried out in a range of −78° C. to 100° C.

In the method of the present invention, the reaction time varies depending upon the catalyst and the reaction temperature and is not particularly limited, but the reaction is usually completed within a range of from 1 to 240 hours.

After completion of the reaction, the reaction solution is dropwise added to a solvent having a low solubility of the product, such as hexane, heptane, methanol, ethanol or isopropanol, for crystallization, whereby the optically active polymaleimide derivative of the present invention can be obtained in the form of a powder. In order to improve the purity, it may be dissolved again in a solvent such as THF or toluene, and then put into e.g. methanol again for recrystallization.

A separating medium made of the optically active polymaleimide derivative of the present invention, contains the compound of the above formula (1) as the effective component.

As the optically active polymaleimide derivative of the above formula (1) as the effective component of the separating medium of the present invention, any derivative may be used so long as it is a polymer having a specific rotation ($[\alpha]_{435}^{25}$) of at least +30°, which is obtained by subjecting the optically active maleimide derivative of the above formula (2) to anionic polymerization in the presence of an asymmetric ligand, as mentioned above.

The separating medium comprising the optically active polymaleimide derivative of the above formula (1) of the present invention, can be used widely as an agent for optical resolution of an optically active compound. A method for optical resolution of an optically active compound by means of the separating medium of the present invention, is not particularly limited. However, for example, an optically active substance can easily be separated by a chromatography method such as gas chromatography, high performance liquid chromatography or thin layer chromatography.

When the separating medium of the present invention is used as a stationary phase of a column packing material for high performance liquid chromatography, the eluent is not particularly limited except for a liquid which dissolves the separating medium of the present invention or which reacts therewith. The separating medium of the present invention is useful for either a normal phase liquid chromatography employing e.g. hexane/isopropanol or a reversed phase liquid chromatography employing e.g. an alcohol/water.

In the present invention, the optically active polymaleimide derivative of the above formula (1) may be used by itself as a separating medium, but for the purpose of improving the pressure resistance of the separating medium, prevention of swelling or shrinkage due to substitution by a solvent or improvement of the theoretical plate number, it may be supported on some carrier.

As the carrier, a porous carrier such as silica gel, alumina, crosslinked polystyrene or polysiloxane, may, for example, be mentioned as a suitable one, and surface treatment may be applied by using an organic silane compound in order to improve the affinity to the optically active polymaleimide derivative.

The particle size of the carrier varies depending upon the column to be used or the size of the plates and is not particularly limited, but it is usually from 1 μm to 10 mm, preferably from 1 to 300 μm. Further, the average pore diameter is usually from 10 Å to 100 μm, preferably from 50 to 100,000 Å. When used as a stationary phase of a column packing material for a high performance liquid chromatography, the carrier is preferably a porous carrier having a particle size of from 1 to 200 μm and an average pore diameter within a range of from 10 to 3000 Å.

The method to have the optically active polymaleimide derivative supported on the carrier may be a physical method or a chemical method and is not particularly limited. The physical method may, for example, be a method wherein the optically active polymaleimide derivative and the porous carrier are contacted each other. The chemical method may, for example, be a method wherein a functional group is imparted to the terminal of the polymer at the time of preparing the optically active polymaleimide derivative, and it is chemically bonded to the porous carrier.

The amount of the optically active polymaleimide derivative to be supported on the carrier varies depending upon the type and the physical properties of the carrier to be used and is not particularly limited, but it is usually within a range of from 1 to 100 wt %, based on the weight of the carrier.

The separating medium of the present invention is useful not only for the packing material of a high performance liquid chromatography column, but also as a shifting reagent for a nuclear magnetic resonance spectrum (NMR), or as a supported material for a column for optical resolution by gas chromatography.

According to the present invention, a novel optically active poly(N-α-methylbenzylmaleimide) having a high (+) rotatory power, which is expected to be useful for e.g. a separating medium for an optically active compound, can be provided by a simple production method. The separating medium made of the optically active compound of the present invention is applicable to various types of separation, and it is industrially very significant.

Now, the present invention will be described in further detail with reference to Examples. However, it should be understood that the present invention is by no means restricted to such specific Examples.

The optically active ligand, i.e. (4S)-2,2'-(1-ethylpropylidene)bis[4-(1-phenylethyl)-4,5-dihydroxazole] (Bnbox), to be used in the preparation of the optically active polymaleimide derivative of the present invention, is one prepared by the method disclosed in S. E. Denmark, et al., J. Org. Chem., 60, 4884 (1995).

The average molecular weight was calculated as a standard polystyrene by gel permeation chromatography (high performance GPC system, manufactured by TOSOH CORPORATION), and the specific rotation was measured by DIP-181, manufactured by JASCO.

For the measurement of the resolution power of the prepared optically active polymaleimide derivative, a multipump CCPM, manufactured by TOSOH CORPORATION, an ultraviolet detector UV-8020 and an integrator of CHROMATOCORDER 21, were employed.

Reference Example 1

Preparation of (S)-(-)-N-α-methylbenzylmaleimide

The preparation was carried out in accordance with the method disclosed in P. Y. Reddy, et al., J. Org. Chem., 62, 2652 (1997).

Into a 500 ml round bottomed three necked flask equipped with a condenser, a dropping funnel and a stirrer, 4.0 g (40.8 mmol) of maleic anhydride and 240 ml of dry benzene were put and dissolved with stirring, and then cooled to 0° C. on an ice bath.

Then, a solution prepared by dissolving 5.2 ml (40.8 mmol) of (S)-(-)-1-phenylethylamine in 100 ml of dry benzene, was added thereto by means of the dropping funnel, and then the mixture was returned to room temperature and stirred for one hour.

Further, while stirring the reaction solution vigorously, 5.56 g (40.8 mmol) of zinc chloride was added thereto, and the mixture was heated to 80° C. on an oil bath, whereupon a solution prepared by dissolving 11.5 ml (54.5 mmol) of hexamethyldisilazane in 80 ml of dry benzene, was dropwise added by means of the dropping funnel, and the reaction was carried out further for 5 hours under reflux by heating.

After completion of the reaction, the reaction mixture was cooled to room temperature, washed with 0.5 N hydrochloric acid and extracted with ethyl acetate, and the extract was washed with a saturated sodium hydrogencarbonate aqueous solution and then with a saturated sodium chloride aqueous solution, and dried over anhydrous magnesium sulfate and concentrated to obtain crude (S)-(-)-N-α-methylbenzylmaleimide. The obtained crude (S)-(-)-N-α-methylbenzylmaleimide was then purified by column chromatography (n-hexane/ethyl acetate=4/1, vol/vol) and then purified by distillation (114° C./8.3×10$^{-3}$ mmHg), to obtain 6.9 g of a white solid (yield: 84%).

Melting point (° C.): 33 to 35° C.

Specific rotation ($[\alpha]_{435}^{25}$): -98.1° (C=1.0, THF)

EXAMPLE 1

Into a 25 ml eggplant type flask containing a magnetic stirrer, 30.9 mg (0.25 mmol) of diethylzinc, 70.3 mg (0.30 mmol) of (-)-sparteine and 5 ml of toluene were charged and stirred at 0° C. for 30 minutes, whereupon 503 mg (2.50 mmol) of (S)-(-)-N-α-methylbenzylmaleimide obtained in Reference Example 1, was added, and a reaction was carried out further at the same temperature for 72 hours.

After completion of the reaction, the reaction solution was put into 50 ml of methanol, and then, the precipitated product was collected by filtration and dried under reduced pressure at room temperature to obtain 0.5 g of the desired optically active poly(N-α-methylbenzylmaleimide) as slightly yellow powder (yield: 100%)

Number average molecular weight (Mn)=12.7×10$^3$, Mw/Mn=10.0

Specific rotation ($[\alpha]_{435}^{25}$)=242.2° (C=1.0, CHCl$_3$)

[Specific rotation$[\alpha]_{435}^{25}$ of THF soluble content=206.0° (C=1.0, THF)]

EXAMPLES 2 and 3

Using the same reaction apparatus as in Example 1, the reaction was carried out under the conditions shown in Table 1. The results are shown in Table 1. With respect to the conditions not shown in Table 1, the reaction was carried out under the same conditions as in Example 1.

EXAMPLES 4 to 6

Using the same reaction apparatus as in Example 1, the reaction was carried out under the conditions shown in Table 1. The results are shown in Table 1. With respect to the conditions not shown in Table 1, the reaction was carried out under the same conditions as in Example 1.

TABLE 1

| | Catalyst[1] | Amount of catalyst (mol %) | Solvent | Reaction temperature (° C.) | Reaction time (hrs) | Yield[2] (%) | Molecular[3] weight: Mn (×10³) | Mw/Mn[4] | Optical[5] rotation (°) |
|---|---|---|---|---|---|---|---|---|---|
| Ex. 2 | (1) | 10 | Toluene | −35 | 72 | 14.8 | 10.5 | 13.4 | +346.9[6] |
| Ex. 3 | (1) | 10 | Toluene | −35 | 44 | 80.5 | —[4] | —[4] | +466.2[6] |
| Ex. 4 | (2) | 10 | THF | 0 | 72 | 100 | 8.9 | 2.4 | +36.1 |
| Ex. 5 | (2) | 10 | Toluene | rt | 72 | 100 | 10.9 | 2.9 | +36.5 |
| Ex. 6 | (2) | 10 | THF | rt | 72 | 100 | 27.2 | 2.5 | +39.5 |
| Comp. Ex. 1 | (3) | 5 | Toluene | 60 | 24 | 88.1 | 3.0 | 1.9 | −30.1 |
| Comp. Ex. 2 | (4) | 10 | Toluene | 0 | 24 | 58.9 | 3.1 | 1.6 | −94.5 |
| Comp. Ex. 3 | (5) | 10 | Toluene | rt | 120 | 61.4 | 3.1 | 1.4 | −106.9 |

[1](1) $Et_2Zn/Sp$ (1.0/1.2 molar ratio)
(2) $Et_2Zn/Bnbox$ (1.0/1.2 molar ratio)
(3) AIBN (Azoisobutyronitrile)
(4) n-BuLi (n-butyl lithium)
(5) $Et_2Zn$
[2]Yield by crystallization from methanol and isolation
[3]Gel permeation chromatography (calculated as standard polystyrene)
[4]Not measured
[5]$[\alpha]_{435}^{25}$, C = 1.0 g/100 ml, L = 10 cm, THF
[6]$[\alpha]_{435}^{25}$, C = 1.0 g/100 ml, L = 10 cm, $CHCl_3$

Comparative Examples 1 to 3

Using the same reaction apparatus as in Example 1, the reaction was carried out under the conditions shown in Table 1. The results are shown in Table 1. With respect to the conditions not shown in Table 1, the reaction was carried out under the same conditions as in Example 1.

EXAMPLE 7

Preparation of silica gel supporting 10% of optically active poly(N-α-methylbenzylmaleimide) (specific rotation $[\alpha]_{435}^{25}$ =206.0° (C=1.0, THF)) and a column packed therewith.

Into a 50 ml eggplant type flask, 500 mg of the optically active poly(N-α-methylbenzylmaleimide) (specific rotation $[\alpha]_{435}^{25}$=206.0° (C=1.0, THF)) prepared in Example 1, and 10 ml of chloroform, were charged and dissolved, whereupon 4.5 g of silica gel (average particle size: 10 μm, average pore diameter 100 Å) was added, and then chloroform was distilled off under reduced pressure by a rotary evaporator to obtain 5 g of silica gel supporting 10% of the desired optically active poly(N-α-methylbenzylmaleimide) (specific rotation $[\alpha]_{435}^{25}$=206.0° (C=1.0, THF)).

The obtained silica gel supporting 10% of the optically active poly(N-α-methylbenzylmaleimide) (specific rotation $[\alpha]_{435}^{25}$=206.0° (C=1.0, THF)), was dispersed in methanol and then packed into a stainless steel column of 2 mmID× 150 mmL by means of a high pressure pump at a flow rate of 3.5 ml/min under the highest pressure of 400 kg/cm². The theoretical plate number of the obtained column was 743 plates. For the measurement of the theoretical plate number, methanol was used as an eluent, and the theoretical plate number was measured by elution of toluene. The theoretical plate number was calculated by the following formula.

Theoretical plate number $(N)=5.54\times[Tr/W_{1/2}]^2$

Tr=retention time (sec)

$W_{1/2}$=half value width (mm)

EXAMPLES 8 to 11

Using the column prepared in Example 7, separation of various compounds was carried out under the conditions shown in Table 2. The results are also shown in Table 2, and their measurement charts are also shown in FIGS. 1 to 4.

TABLE 2

Figure 2:
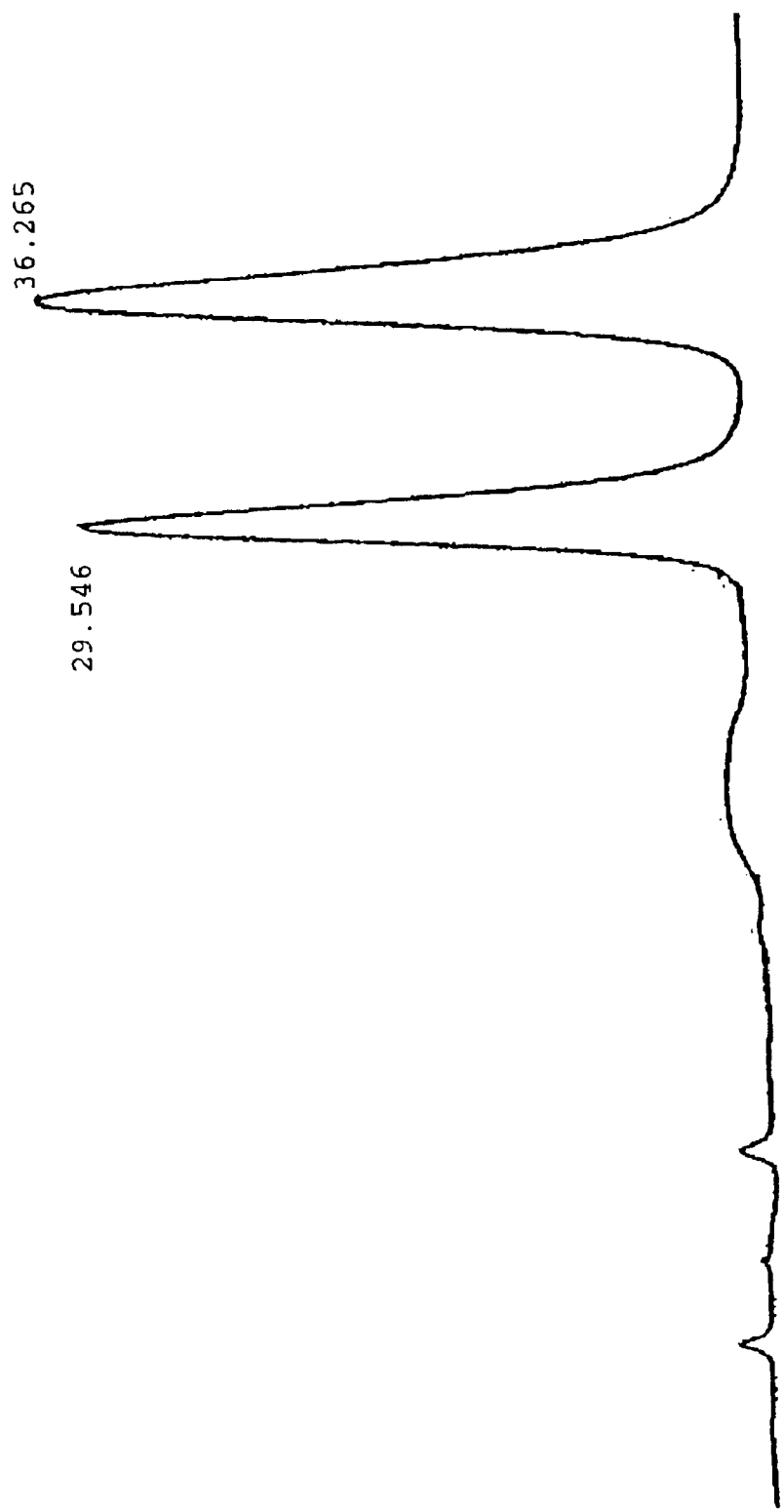
FIG. 2 is a measurement chart showing the results of Example 9.
Figure 3:
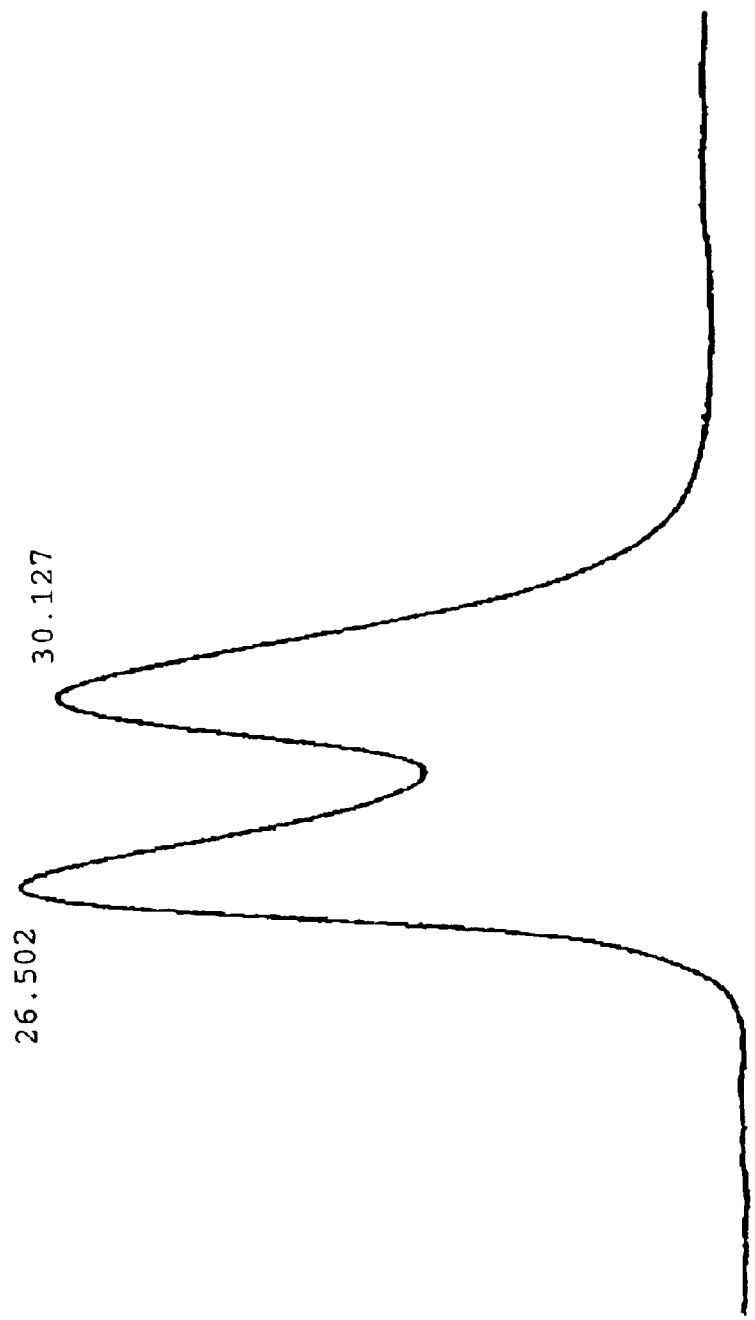
FIG. 3 is a measurement chart showing the results of Example 10.
Figure 4:
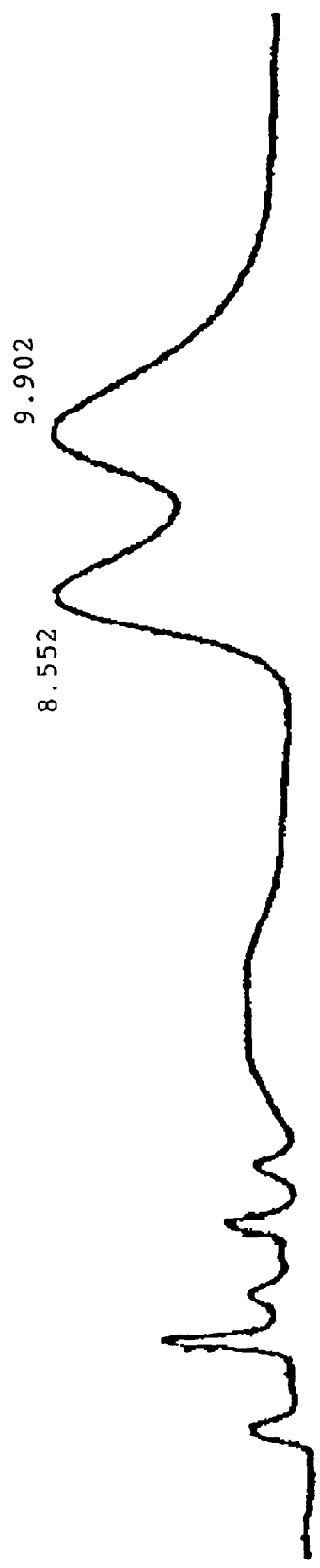
FIG. 4 is a measurement chart showing the results of Example 11.

| Example | Compound[1] | Mobile phase[2] | Flow rate ml/min | k1'[3] | k2'[4] | α[5] | Measurement chart |
|---|---|---|---|---|---|---|---|
| 8 | A | (1) | 0.5 | 5.1 | 6.5 | 1.27 | FIG. 1 |
| 9 | A | (1) | 0.1 | 5.2 | 7.3 | 1.39 | FIG. 2 |
| 10 | B | (1) | 0.5 | 26.1 | 29.8 | 1.14 | FIG. 3 |
| 11 | C | (1) | 0.3 | 5.0 | 5.9 | 1.20 | FIG. 4 |

[1]Compound A: (±)-2,3-dihydro-2-(benzyloxymethyl)-4H-pyran-4-one
Compound B: (±)-2,3-dihydro-2-(ethoxycarbonyl)-4H-pyran-4-one
Compound C: N-phenylsulfonyl (±)-2,3-dihydro-2-phenyl-4-oxo-4H-pyridylamide
[2]Mobile phase (1): n-hexan/isopropano = 90/10 (vol/vol)
[3]k1': Retention coefficient of an enantiomer eluting first k1' = (t1 − t0)/t0 (as t0, the value of 1,3,5-tri-tert-butylbenzene was used)
[4]k2': Retention coefficient of an enantiomer eluting secondly k2' = (t2 − t0)/t0 (as t0, the value of 1,3,5-tri-tert-butylbenzene was used)
[5]α: Separation factor α = k2'/k1'

Figure 5:
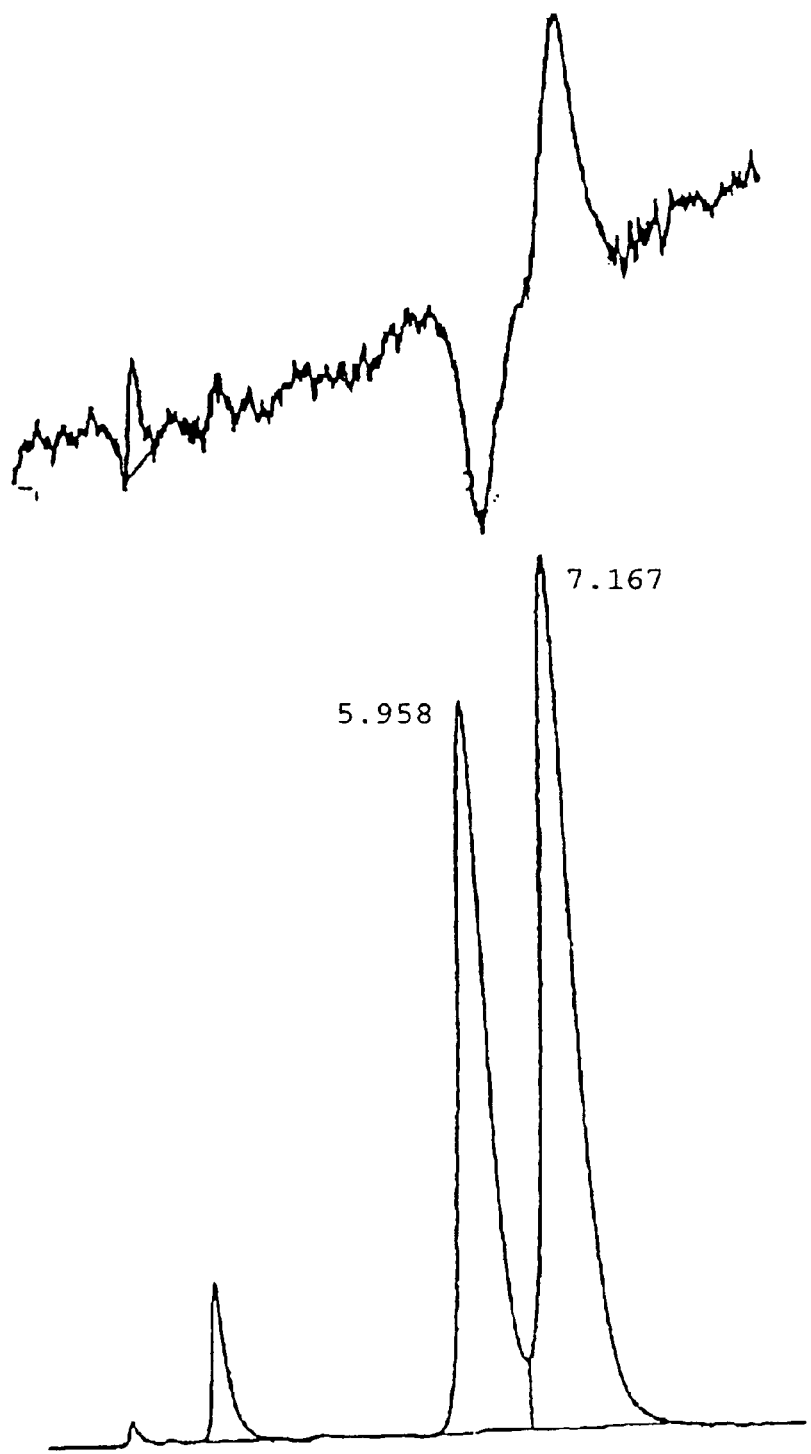
FIG. 5 is a measurement chart showing the results of Example 8 (upper chart: measurement by an optical rotation detector; lower chart: measurement by a UV detector)

Further, in order to confirm the optical resolution in Example 8, an ultraviolet detector and an optical rotation detector were connected in parallel, and the measurements were carried out. The results are shown in FIG. 5 (upper chart: optical rotation detector, lower chart: UV detector). By the optical rotation detector, the optical resolution of a racemic modification was confirmed.

Comparative Example 4

Into a 25 ml eggplant type flask containing a magnet stirrer, 4.1 mg (0.025 mmol) of 2,2-azobis(isobutylnitrile) and 5 ml of toluene were charged and stirred at room temperature for 30 minutes, whereupon 503 mg (2.50 mmol) of (S)-(–)-N-α-methylbenzylmaleimide obtained in Reference Example 1, was added. Then, the mixture was heated on an oil bath, and the reaction was carried out at 50° C. for 24 hours.

After completion of the reaction, the reaction solution was put into 50 ml of methanol, and then, the precipitate was collected by filtration and dried under reduced pressure at room temperature to obtain 0.5 g of poly(N-α-methylbenzylmaleimide) formed by radical polymerization, as slightly yellow powder (yield: 100%).

Number average molecular weight $(Mn)=6.0 \times 10^3$, $Mw/Mn=31.6$

Specific rotation $[\alpha]_{435}^{25}=-123.5°$ (C=1.0, CHCl$_3$)

Comparative Example 5

A packing material having 10% of the polymaleimide obtained in Comparative Example 4, supported on silica gel in the same manner as in Example 7, was prepared, and (±)-2,3-dihydro-2-benzyloxy)-4H-pyran-4-one was analyzed under the same condition as in Example 8, whereby a single peak was observed, and no resolution was observed.

The entire disclosure of Japanese Patent Application No. 2000-295454 filed on Sep. 25, 2000 including specification, claims, drawings and summary are incorporated herein by reference in its entirety.

What is claimed is:

1. A separating medium having supported on a carrier an optically active poly(N-α-methylbenzylmaleimide) represented by the following formula (1):

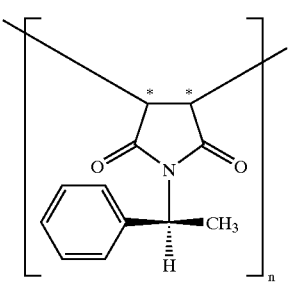

Formula (1)

wherein n is a number within a range of from 2 to 10,000, and symbol * represents optically active carbon, and having a specific rotation $([\alpha]_{435}^{25})$ of at least +30°.

2. A method for separating an optically active compound, which comprises separating an optically active compound by chromatography employing the separating medium as defined in claim 1.

* * * * *